UNITED STATES PATENT OFFICE.

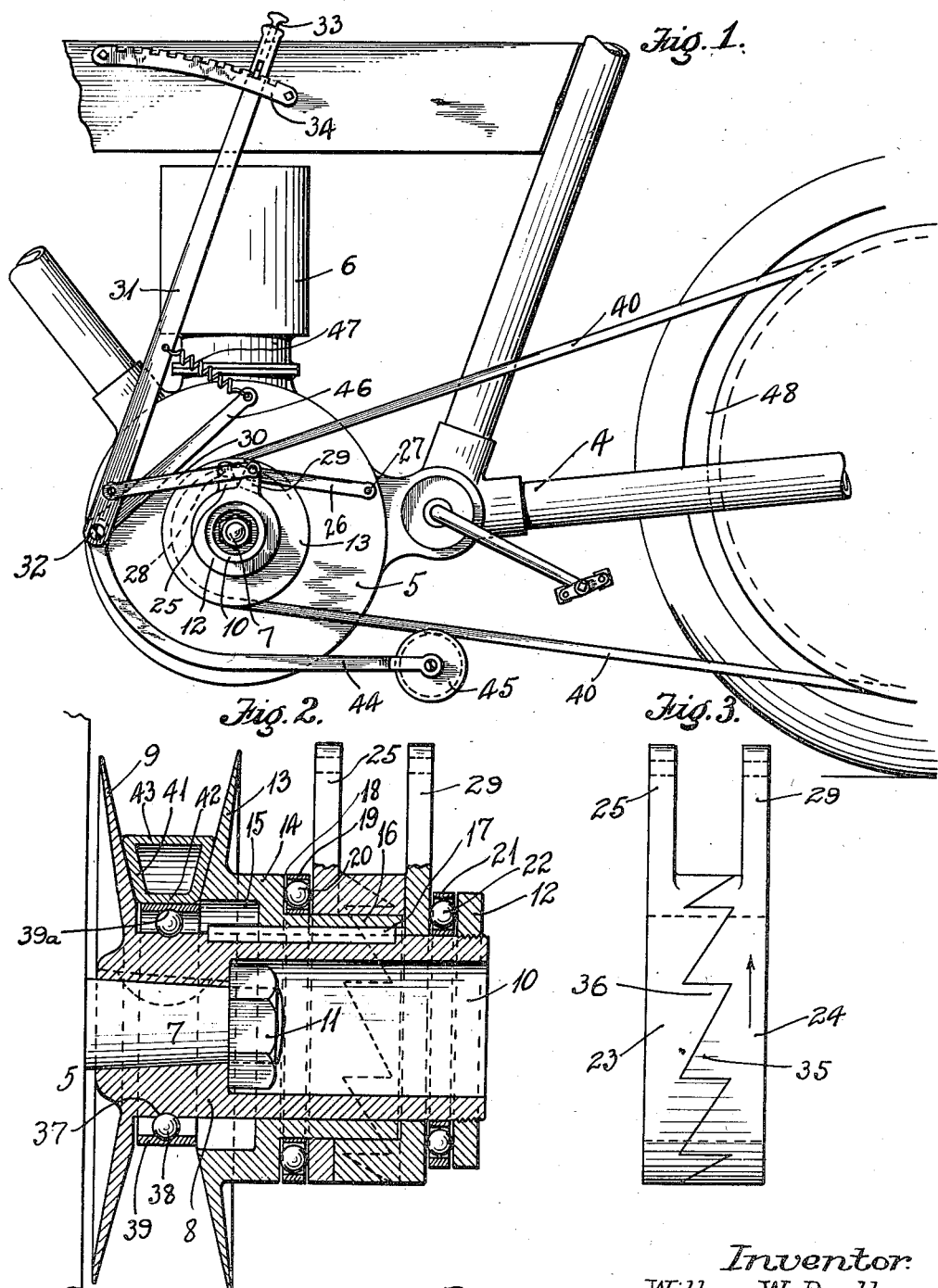

WILBUR W. PRATHER, OF ADAMS SPRINGS, CALIFORNIA.

VARIABLE-SPEED-TRANSMISSION DEVICE.

1,012,912. Specification of Letters Patent. Patented Dec. 26, 1911.

Application filed February 23, 1910. Serial No. 545,285.

*To all whom it may concern:*

Be it known that I, WILBUR W. PRATHER, a citizen of the United States, residing at Adams Springs, in the county of Lake and State of California, have invented new and useful Improvements in Variable-Speed-Transmission Devices, of which the following is a specification.

This invention relates to transmission devices and the object of the invention is to produce a device of this class which can be readily adjusted so as to vary the speed of driving.

The invention is particularly applicable to motorcycles employing a belt drive and is particularly useful in this connection for the reason that the device performs the function of a clutch for it operates to prevent the transmission of power in certain positions. This gives it great utility when used in motorcycles. for the reason that I produce the effect of a combined clutch and transmission.

In the annexed drawing which fully illustrates my invention, Figure 1 is a side elevation showing parts of the motorcycle to which my invention has been applied. Fig. 2 is a longitudinal section taken through the horizontal axis of my transmission device, and showing details of its construction, certain parts being omitted. Fig. 3 is a side elevation of a pair of adjusting collars by means of which the device is adjusted so as to transmit the power at different speeds.

Referring more particularly to the parts, 4 represents the frame of the motorcycle, which may be of usual construction. As indicated at the usual point a crank case 5 is provided above which an engine or motor 6 is mounted. From the crank case 5, a tapered stub shaft 7 projects, and on this stub shaft 7 I attach a hub 8. At its end adjacent to the crank case 5, the hub 8 is formed into a cone or collar 9, and at its other end it is provided with a tubular neck or extension 10. The hub 8 is securely held by a hub nut 11 mounted on the end of the shaft 7, as shown. The outer extremity of the neck 10 is threaded so as to receive a thrust nut 12, which is rigidly secured to the neck as indicated. Opposite the cone or collar 9 I provide a similar collar 13, the hub 14 of which is offset so as to form an annular chamber 15 around the hub 8, and the hub 14 is further provided with a tubular extension or sleeve 16, which is mounted to slide on the neck 10, as shown. The neck 10 is provided with a feather or spline 17, which is received in a corresponding groove in the sleeve 16, so that the collar or cone 13 is nonrotatable on the neck, although it can slide freely thereupon, as will be readily understood.

The hub 14 presents an annular face or shoulder 18 adjacent to which a ball ring 19 is mounted loosely around the sleeve 16, and this ball ring is provided with a plurality of openings receiving loose balls 20, as shown. A similar ball ring 21 is provided adjacent to the fixed collar 12 and this ring is provided with loose balls 22, which run on the inner face of the collar 12, as shown. Between the rings 19 and 21, a pair of adjusting collars 23 and 24 are mounted, the latter collar being disposed near the outer end of the neck 10. The collar 23 is loosely mounted on the sleeve 16, while the collar 24 is loosely mounted on the neck 10, as indicated. The collar 23 is provided with a radially projecting arm 25, and this arm is connected by a link 26 with the outer side of the case 5 by means of a suitable pivot bolt 27. A loose pivot connection 28 is formed for connecting the link 26 to the arm, which will permit the collar 23 to slide inwardly or outwardly on the sleeve 16. This sliding movement may be given to the collar 23 by rotating the collar 24 in the direction of the arrow indicated in Fig. 3. In order to rotate this collar it is provided with a radial arm 29, which is connected by a link 30 with the hand lever 31, said hand lever being pivotally mounted at 32 near the forward edge of the crank case. This hand lever 31 extends upwardly and is provided with a locking device 33 coöperating with the fixed segment 34, which enables the lever to be locked in any position desired. The sliding movement of the collar 23 is imparted to it by means of inclined teeth 35, which are formed on the collar 24 and mesh with corresponding inclined teeth 36 formed on the collar 23. These teeth have inclined faces and abrupt faces, as shown.

On the hub 8 adjacent to the cone 9, a circumferential groove or ball race 37 is formed in which run a plurality of balls 38, and on the outer side of these balls a hub ring 39 is loosely mounted, said hub ring having a groove 39ᵃ for the balls shown. This hub ring is of sufficiently small diameter to be received in the chamber 15 when the cone 13 advances under the action of the collar 24. The members 9 and 13 are in the form of flat cones, and they constitute a driving pulley adapted to receive a driving belt 40 of the form indicated. The form of this belt in cross section is indicated in Fig. 2. It presents flat side walls 41, which diverge from each other, and these side walls are adapted to lie against the cones 9 and 13 as indicated. These side walls 41 are integrally connected with an inner wall 42, which may run on the ball ring 39 and are connected near their outer edges with an outer wall 43 so that the belt presents the tapered form indicated. On the pivot 32 of the lever 31, a belt-tightener is attached, the same being in the form of a bell-crank lever having an arm 44, which projects under the forward end of the belt 40. This arm is provided with a pulley 45, which rests against the end run of the belt, as shown. The belt tightener also has an upwardly extending arm 46, and this arm is connected by a spring 47 with the lever 31, as indicated. As represented in Fig. 2 the collars 9 and 13 are separated so that the belt 41 is running on the ring 39 without transmitting power from the pulley to the rear wheel 48 of the motorcycle. When in this relation the lever 31 would be in a position opposite to that in which it is shown in Fig. 1 with the pulley 45 pressed upwardly against the lower run of the belt, so as to take up the slack thereof. In Fig. 3 the adjusting collars 23 and 24 are shown in the position which they will have when the belt 40 is running on the loose ring 39. Under these circumstances no power will be transmitted and the pulley composed of the cones 9 and 13 will constitute an open clutch.

When it is desired to start up the motorcycle while the engine is running, it will only be necessary to rotate the adjusting collar 24 in the direction indicated by the arrow in Fig. 3. This will slide the sleeve 16 and the cone 13 toward the left. As the cone 13 moves toward the left the belt 40 will be forced outwardly automatically as it were, toward the conical faces of the two cones, so that it will be held in some position removed from the ring 39. It will then transmit power from the driving pulley to the rear wheel 48 and the speed of transmission of the wheel will depend on the position of the belt, that is, if the belt moves out to the extreme edge of the pulley formed by the cones, as indicated in Fig. 1, the transmission will take place at the greatest possible speed. The speed of transmission at an intermediate position of the belt will be proportional of course to the radius at which the belt is located on the driving pulley. As the cone 13 advances, the ring 39 is received in the chamber 15 of the hub 14. The thrust of the collar 23 on the hub 14 is of course taken up at the balls 20 and 22 so that the friction of the operation of the device is greatly reduced.

Special attention is called to the fact that when the cone 13 advances toward the cone 9, the effect is produced of closing a clutch at this point which brings the drive gradually into operation at the lowest speed. This is a particularly advantageous manner of starting up the device, and as the speed increases the cone 13 can be advanced farther and farther until the motorcycle is finally running at its maximum speed, with the belt at the outer edge of the driving pulley.

Attention is called to the coöperative action of the belt tightener, which results in always maintaining a certain amount of tension in the belt 40. This tension operates to return the cone 13 to its normal position and keeps the shoulder 18 up against the balls 20 as the collar 23 is returning to its normal position.

It should be understood also that forcing the collar 13 toward the collar 9 does not produce end thrust against the shaft of the engine for the reason that the adjusting collars 23 and 24 are arranged to take the thrust which they exert on their side faces; the collar 24 tends to pull the collar 9 toward the collar 13 with the same force that the adjusting collar 23 tends to force the collar 13 toward the collar 9.

Having described my invention what I claim as new and desire to secure by Letters Patent is:

1. In combination, a driving shaft, a driving pulley mounted thereon having a fixed collar, a movable collar and a laterally projecting hollow shaft portion, a pair of adjusting collars mounted upon the hollow shaft and having inclined teeth on their adjacent sides, means for anchoring one of said collars to a fixed support adjacent to the mechanism, a lever mounted adjacent to the mechanism and connected with the other collar and adapted to move it back and forth with respect to the anchored collar, the collars of the said driving pulley having inclined faces on their adjacent sides, a belt received between said inclined faces, and driven by said pulley, a belt tightener coöperating with said belt for controlling its slack, the said tightener coöperating with said belt for controlling its slack, the said tightener being pivotally mounted with respect to the collar actuating lever, and a spring for connecting one end of the tightener with the said lever whereby the tightener is moved with a resilient action when the lever is adjusted.

2. In combination, a driving shaft, a driving pulley mounted thereupon having a fixed collar and a sliding collar a pair of adjusting collars mounted coaxially with respect to said shaft and having inclined teeth on their adjacent sides, means for fixing one of said adjusting collars against rotation, a lever, means connecting said lever with other of said adjusting collars for rotating the same, said first adjusting collar being adapted to advance said movable collar, said pulley collars having inclined faces on their adjacent sides, a belt received between said conical faces and driven by said pulley, a belt tightener coöperating with said belt to take up the slack thereon when said pulley collars are remotely separated, and a resilient connection between said lever and said belt tightener.

In witness that I claim the foregoing I have hereunto subscribed my name this 15th day of February, 1910.

WILBUR W. PRATHER.

Witnesses:
F. D. AMMEN,
EDMUND A. STRAUSE.